United States Patent [19]

Chambers

[11] 3,924,699

[45] Dec. 9, 1975

[54] CONVEYOR SCALE WITH INTEGRATOR

[76] Inventor: Robert B. Chambers, 607 Krall St., Boise, Idaho 83702

[22] Filed: Feb. 27, 1975

[21] Appl. No.: 553,649

[52] U.S. Cl. .................... 177/16; 177/212; 74/128
[51] Int. Cl.² .................... G01G 11/14; G01G 1/38; F16H 27/02
[58] Field of Search ......... 177/16, 212; 74/128, 575

[56] References Cited
UNITED STATES PATENTS

| | | | |
|---|---|---|---|
| 3,155,181 | 11/1964 | Chambers............................. | 177/16 |
| 3,512,596 | 5/1970 | Haach................................ | 177/16 X |
| 3,590,656 | 7/1971 | Lloyd, Jr............................. | 74/575 |

FOREIGN PATENTS OR APPLICATIONS

| | | | |
|---|---|---|---|
| 682,875 | 11/1952 | United Kingdom.................. | 74/128 |

*Primary Examiner*—George H. Miller, Jr.
*Attorney, Agent, or Firm*—Hill, Gross, Simpson, Van Santen, Steadman, Chiara & Simpson

[57] ABSTRACT

A ratchet device which is separately driven in opposite directions in response to a control signal comprising a ratchet wheel supported for rotation and having a connection for converting movement of the wheel into an output movement, a double ratchet pawl oscillated adjacent the periphery of the ratchet wheel, a control element for selectively engaging the pawl in response to a control signal and adjustment means for interconnecting the control element and the pawl. The adjustment means includes a pin on the pawl, a threaded member having an extension extending at an angle to the axis of the threaded portion of the member and a single spring having an end received on the extension and the other end encircling the pin of the pawl so that rotation of the threaded member applies a bias on the pawl to enable adjustment of the orientation of the pawl relative to the periphery of the ratchet wheel.

2 Claims, 6 Drawing Figures

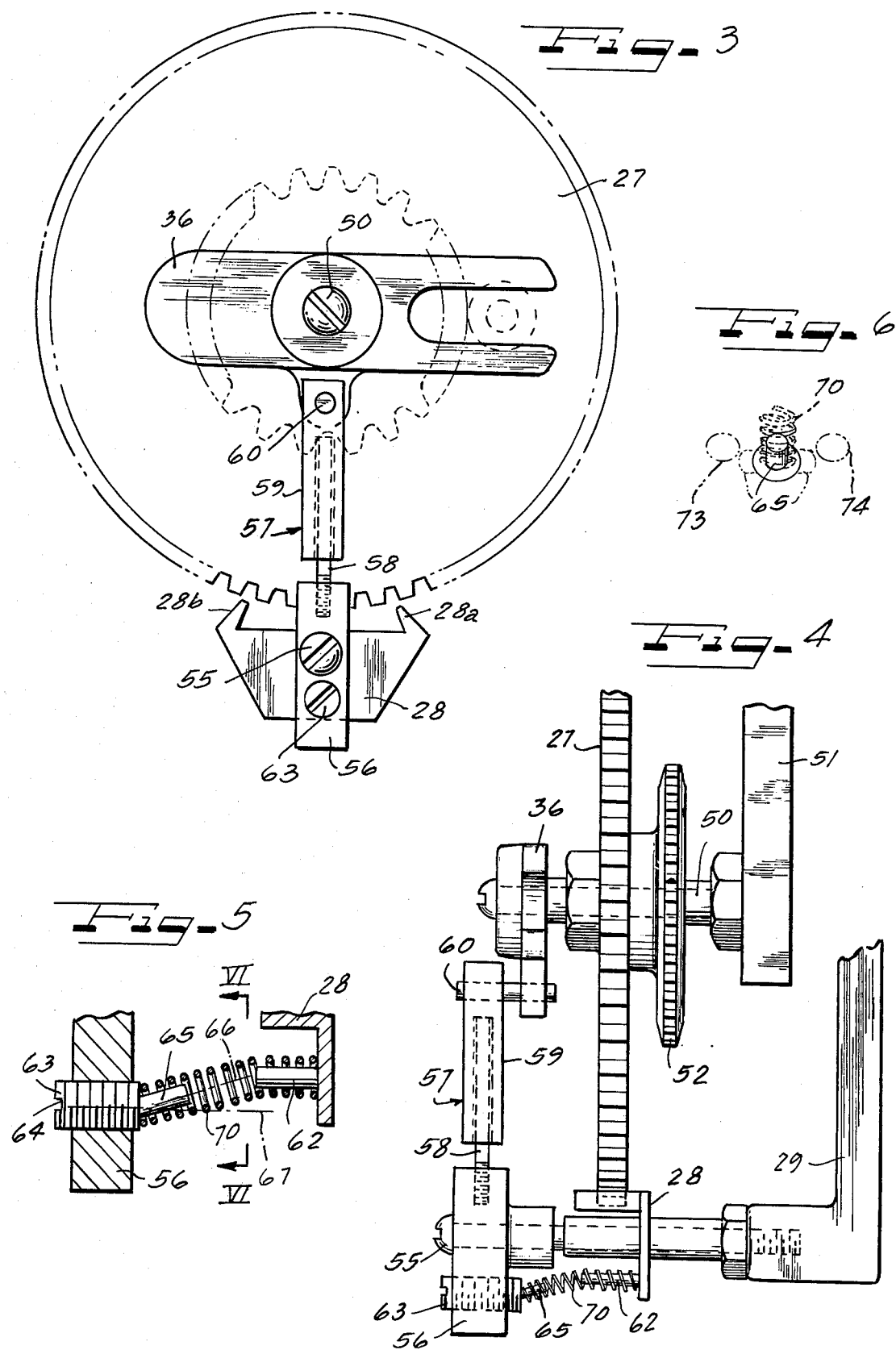

CONVEYOR SCALE WITH INTEGRATOR

BACKGROUND OF THE INVENTION

1. Field of the Invention

The present invention is directed to a ratchet device which is selectively driven in opposite directions in response to a control signal.

2. Prior Art

A ratchet device which was used in a conveyor scale and recorder is disclosed in U.S. Pat. No. 3,155,181. The scale had a pair of cones which were mounted with their axes in parallel for rotation, one of the cones was driven by a belt of the conveyor and the transfer means or device was disposed between the cones for transferring the rotation of one cone to drive the other cone whose output shaft was connected to a counter or recorder. The transfer means utilizes a pair of friction balls and was shifted along the axes of the pair of cones by a shifting means including a ratchet device which was separately driven in opposite directions in response to a control signal such as the weight applied to the belt conveyor.

The ratchet device had a control element which received the control signal and was connected by a pair of springs to the pawl that engages the ratchet wheel in response to movement of the control element. The pair of springs provided a resilient but positive connection between the control element and the pawl and enables adjustment of the orientation of the pawl relative to the ratchet wheel. However, the adjustments by utilizing the two springs was time consuming. Also, the adjustment is a bulky arrangement and involves high manufacturing expenses for the necessary parts.

SUMMARY OF THE INVENTION

The present invention is directed to a ratchet device which utilizes less parts, and has a positive but resilient adjustment between the control element and the pawl of the ratchet device. To accomplish this, the ratchet device of the present invention includes a ratchet wheel having a periphery, a shaft supporting the ratchet wheel for rotation, means connected to the ratchet wheel for converting movement of the wheel into an output movement, a double ratchet pawl, means for oscillating the ratchet pawl in an arc adjacent the periphery of the ratchet wheel, control means for selectively engaging the pawl in response to the control signal, and adjustable means including a pin on the pawl, a member rotatably mounted on the control means and a single spring having one end engaged on the member and the other end encircling the pin so that rotation of the member applies a bias on the pawl to enable adjustment of the orientation of the pawl relative to the periphery of the wheel. Preferably, the member is a threaded member which is threadably received in a portion of the control means along an axis of rotation and has an extension extending at an angle to the axis of rotation. The spring is engaged on this extension so that the rotation of the threaded member through 180° shifts the direction of the bias force of the spring from one side of the threaded member to the opposite side.

The ratchet device of the present invention is particularly useful when incorporated in a device used in indicating weight on a conveyor belt or the like.

BRIEF DESCRIPTION OF THE DRAWINGS

FIG. 3 is a front view of the ratchet device in accordance with the present invention;

FIG. 4 is a side view with portions broken away for the ratchet device of FIG. 3;

FIG. 5 is an enlarged fragmentary view in accordance with the present invention; and FIG. 6 is a cross-sectional view taken along lines VI—VI of FIG. 5.

DESCRIPTION OF THE PREFERRED EMBODIMENTS

Figure 1:
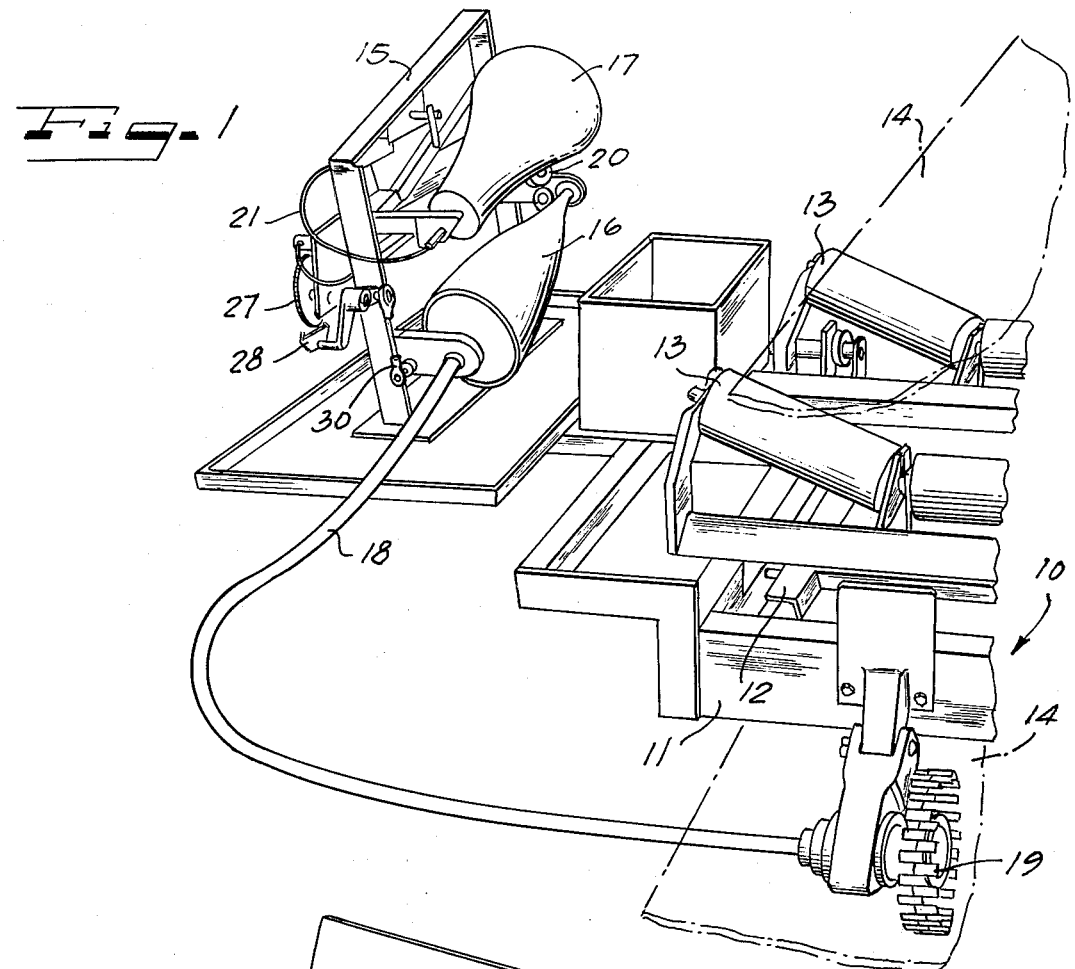
FIG. 1 is an isometric view of a conveyor scale and recorder with the ratchet device in accordance with the present invention.
Figure 2:
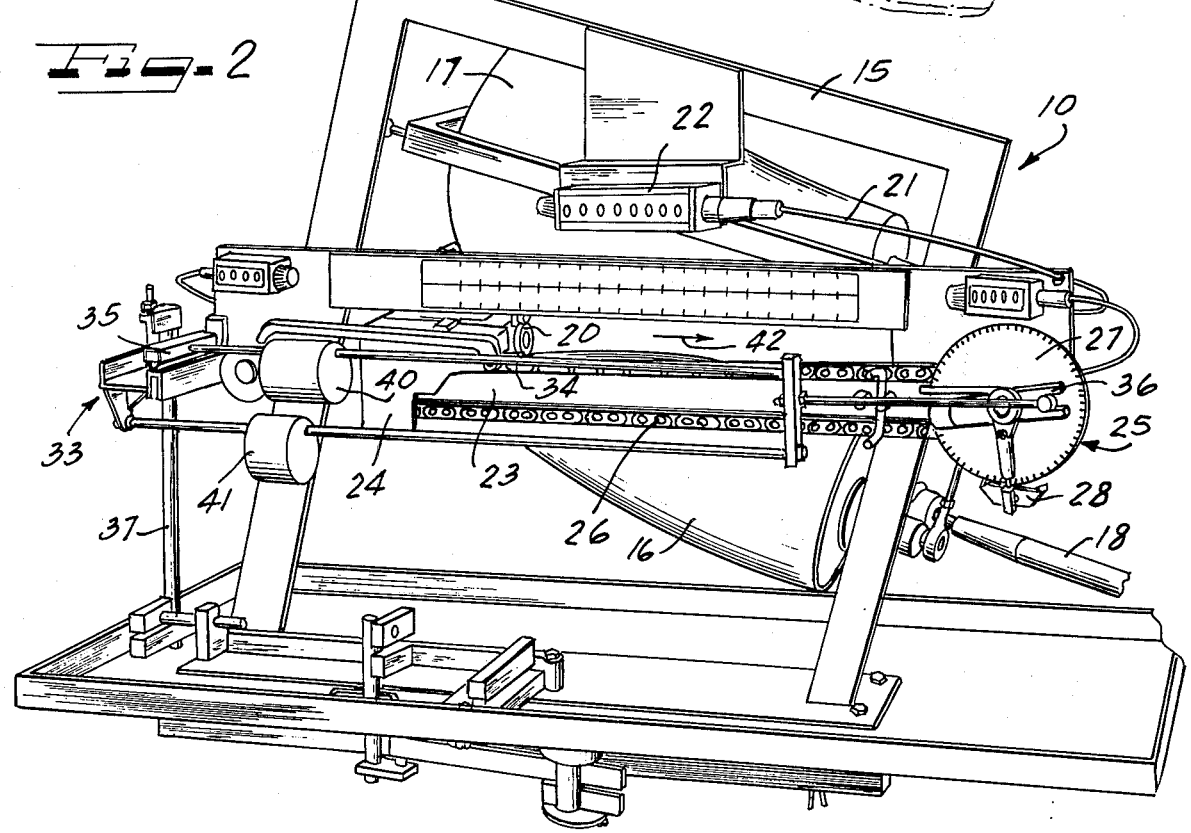
FIG. 2 is a side view with portions removed for purposes of illustration of the conveyor scale and recorder of FIG. 1.

The principles of the present invention are particularly useful in a conveyor scale and recorder generally indicated at 10 in FIGS. 1 and 2. The scale 10 includes a frame 11 which supports a sensing frame 12 which is positioned under a pair of trough idlers 13,13 which act as sensing idlers for sensing the load carried on the belt 14 of the belt conveyor. Adjacent to the conveyor and on one side of the frame 11 is a sub-frame 15 which rotatably supports a first cone member 16 and a second cone member 17 with their axes being parallel. The first cone member 16 is driven by a flexible shaft 18 extending to a timing wheel 19 which is mounted on the frame 11 and is biased into engagement with the return portion of the belt 14. Thus, the first cone member 16 rotates at a speed determined by the speed of the belt 14 on the belt conveyor.

A transfer means 20 which includes a pair of rollers or rotors engages the surfaces of the two cone members 16 and 17 to transfer rotation of the first member 16 to the second member 17. The output of the second cone member 17 is conducted through a flexible cable 21 to a recorder or indicator 22 (FIG. 2) and, if necessary, through an appropriate reduction device.

The transfer means 20 is mounted in sub-frame 15 on a guide means such as a bar guide 23 for movement along the axes of the members 16 and 17 by support means including a support housing 24. The support housing 24 is mounted on bar guide 23 by a shifting means generally indicated at 25 which means shifts the transfer means axially along the surfaces of the members 16 and 17.

The shifting means 25 includes a chain 26 connected to the housing 24, means for shifting or moving the chain which includes a double ratchet wheel 27 having a pawl 28 which is carried on an oscillating arm 29 which is oscillated through a given arc by an eccentric drive 30 attached to the drive shaft 18 of the lower cone member 16. The eccentric drive 30 oscillates the arm 29 through one cycle for each rotation of the cone member 16.

To energize the shifting means 25, the signal applying means 33, which includes a weight bar or balance beam 34, which is mounted on a pivot fulcrum 35 with one end slidably received in a control member 36, is provided. Means for pivoting the weight bar 34 on its fulcrum 35 in response to the load sensed by the sensing rollers 13,13 is illustrated as comprising a linkage 37 that is attached to the end adjacent the fulcrum 35 and is connected to the support frame 12. A shiftable weight 40 is slidably received on bar 34 and is interconnected with the housing 24 of the support means so that the weight moves with the transfer means 20. Additional adjusting weights 41 are present to adjust the balance position of weight bar 34.

As illustrated in FIG. 2, the transfer means 20 is in a position for no load on the belt 14 and while in this position the transfer means 20 is out of engagement with the cone member 17 so that it is not rotated.

Assuming the belt receives a load, the linkage 37 pivots the weight bar 34 from a neutral or null position to rotate the control member 36 in a counterclockwise direction to cause engagement of the pawl member 28 to rotate the ratchet wheel 27 to move the chain 26 to shift the transfer means 20 in the direction of arrow 42. As the transfer means shifts in the direction 42, the weight 40 is moved on the weight bar 34 to counterbalance the force causing pivoting of the weight bar 34. When the weight 40 reaches a position on the bar 34 to balance the force applied by the linkage 37, the weight bar returns to the neutral position and causes the control member 36 to move the pawl 28 to a neutral position which is disengaged from the ratchet wheel 27 to prevent further movement on the chain 26.

In a similar manner, a decrease load on the belt is sensed causing the weight 40 to shift the weight bar in a clockwise direction to act on the control member 36 which causes the pawl 28 to engage the ratchet wheel 27 to move the chain in the opposite direction so that the housing 24, the transfer means 20 and weight 40 are shifted in a direction opposite to the arrow 42 until the bar 34 assumes a balance condition.

The axial position of the transfer means 20 between the first and second cones determines the rate of rotation of the second cone as it is driven by the constant rate of rotation of the first cone. The rate of rotation of the second cone is connected to a counter or other sensing device to give an indication of the load being carried on the conveyor belt 14. It should be pointed out that a more detailed description of the operation of this type of scale device 10 is described in U.S. Pat. No. 3,155,181. The cone members 16 and 17 are surface of revolution which have a contoured non-linear side surfaces.

As best illustrated in FIGS. 3 and 4, the ratchet wheel 27 is mounted for rotation on a shaft 50 which extends to a member 51 of the frame 15. Attached to the ratchet wheel 27 is a sprocket gear 52 which moves the chain 26 and thus acts as means to convert rotation of the ratchet wheel into an output movement.

The pawl 28, which has two spaced teeth 28a and 28b, is mounted by a threaded fastener 55 on the arm 28 which fastener also supports for relative rotation a member 56 of the control means. The member 56 is connected to the member 36 by a sliding joint arrangement 57 having a rod 58 attached to the member 56 and received in a sleeve 59 which is pivotably connected at 60 to the element 36.

An adjustable connecting means transfers control signals from the control means to the pawl 28. The adjustable connecting means includes a pin 62 disposed on the pawl, a threaded fastener 63 threadably received in a threaded bore of the element 56 for rotation about an axis. The fastener 63, which has a slot 64, has an extension 65 of a reduced diameter which has an axis 66 extending at an angle to the axis of rotation 67 of the threaded member 63. A single spring 70 has one end tightly received on the extension 65 and the other end encircling or surrounding the pin 62.

The spring 70 urges the pawl 28 away from the portion of member 56 and determines the orientation of the pawl 28 relative to the periphery of the ratchet wheel 27. Due to the angle of the extension, a rotation through 180° will shift the spring through a circle having a diameter greater than the diameter of the spring 70.

As illustrated in FIG. 6, rotation in either direction through 90° from the position shown in bold lines will have the end of the spring 70 as it surrounds the pin 62 shifted from two opposite positions as illustrated as 73,74. Thus, the position of the member 63 will apply a bias on the pawl 28 which bias will change the orientation of the pawl to the periphery of the ratchet wheel 27 when the ratchet wheel is in the neutral position, as illustrated in FIG. 3.

The ratchet device of FIGS. 3 and 4 operate in the following manner. When the element 36 is rotated in a clockwise direction, the pivot 60 is rotated in a clockwise direction to rotate the member 56 on the shaft or fastener 55 so that member 63 is shifted in a counterclockwise direction. The adjustment means through the spring will shift the pawl in a clockwise direction so that the ratchet tooth 28a will be engaged in the teeth on the periphery of the ratchet wheel 27. The oscillating movement of the pawl 28 by the arm 29 will cause rotation of the ratchet wheel 27 in a clockwise direction as the arm moves the pawl in a clockwise direction. On the return stroke, the cam surfaces of the tooth 28a will cause the pawl to be disengaged until beginning of the next stroke in the clockwise direction.

When the element 36 is rotated in the counterclockwise direction from the position illustrated in FIG. 3, the opposite tooth 28b will engage the teeth of the ratchet wheel 17 to rotate the wheel in a counterclockwise direction. In both instances, it should be realized that the amount of rotation of the element 36 will affect the length of the stroke during which a tooth such as 28a will be engaged on the teeth of the ratchet wheel.

As illustrated, the pawl 28 is in a neutral position so that during oscillation, it will not engage the wheel 27. Due to manufacturing tolerances, it is necessary to provide an adjustment of the orientation of the pawl 28 relative to the periphery to ensure it remains in a neutral position during oscillation of the arm 29. The single spring of the present invention enables sensitive adjustment of a biasing force applied to the pawl 28 to counteract any imbalances due to manufacturing tolerances.

While the ratchet device of the present invention was discussed for use in the embodiment of the conveyor scale and recorder, it will have other uses in which a ratchet is required to move in two different directions in response to control signals to produce an output movement.

Although various minor modifications might be suggested by those versed in the art, it should be understood that I wish to employ within the scope of the patent granted hereon, all such modifications as reasonably and properly come within the scope of my contribution to the art.

I claim:

1. In a device for use in indicating weight on a conveyor belt or the like comprising a pair of cones mounted for rotation about substantially parallel axes, means for rotating one of the pair of cones as a direct function of the rate of movement of a conveyor belt, transfer means for engaging the surfaces of the pair of cones and transmitting rotation of the one cone to the other cone of said pair of cones, means for supporting transfer means for movement along the axes of the pair of cones and means for shifting the transfer means in response to weight on the conveyor belt, the improvements comprising the shifting means including a ratchet wheel having a periphery, a shaft support the ratchet wheel for rotation, means connected to the ratchet wheel for converting movement of the wheel into an output connected to the transfer means, a double ratchet pawl, means for oscillating the pawl in an arc adjacent the periphery of the ratchet wheel, control means for selectively engaging the pawl in response to a weight on the belt, and adjustable means for interconnecting the control means and pawl, said adjustable means including a pin on the pawl, a member rotatably mounted on the control means and a single spring having one end engaged on the member and the other end encircling the pin so that rotation of the member applies a bias on the pawl to enable adjustment of the orientation of the pawl relative to the periphery of the wheel.

2. In a device according to claim 1, wherein said member is threaded into a portion of the control means along an axis of rotation and has an extension extending along a second axis at an angle to the axis of rotation, said spring being engaged on said extension so that rotation of the threaded member in said portion through 180° shifts the direction of the bias force of the spring from one side to the opposite side of the threaded member.

* * * * *